United States Patent [19]

Takacs

[11] Patent Number: 5,278,392
[45] Date of Patent: Jan. 11, 1994

[54] SELF-CLEANING NOZZLE FOR A GAS WELDING TORCH

[75] Inventor: Donald E. Takacs, Mishawaka, Ind.

[73] Assignee: Tomkins Industries, Inc., Dayton, Ohio

[21] Appl. No.: 961,467

[22] Filed: Oct. 15, 1992

Related U.S. Application Data

[63] Continuation-in-part of Ser. No. 837,482, Feb. 18, 1992, abandoned.

[51] Int. Cl.⁵ .............................................. B23K 9/00
[52] U.S. Cl. ................................ 219/137.43; 219/136
[58] Field of Search ............................ 219/136, 137.43

[56] References Cited

U.S. PATENT DOCUMENTS

| | | |
|---|---|---|
| 2,769,894 | 4/1956 | Rives . |
| 2,836,705 | 9/1958 | Cotter . |
| 3,048,691 | 7/1962 | Longstreth . |
| 3,226,526 | 2/1965 | Shearer, Jr. . |
| 3,430,837 | 6/1969 | Hein . |
| 3,536,888 | 5/1970 | Borneman . |
| 3,697,721 | 4/1972 | Robba et al. . |
| 4,609,804 | 11/1986 | Kishi et al. . |
| 5,034,593 | 3/1991 | Rice et al. . |

FOREIGN PATENT DOCUMENTS 457560 4/1975 U.S.S.R. .
497109 7/1976 U.S.S.R. .

*Primary Examiner*—Clifford C. Shaw
*Attorney, Agent, or Firm*—Jacox & Meckstroth

[57] ABSTRACT

A welding torch for gas metal arc welding has a torch body which conducts electricity, receives a cable for directing a welding wire, and defines a passage for directing a shielding gas. A conductor tube has an inner end portion secured to the torch body and a free outer end portion, and a contact tip is secured to the outer end portion of the conductor tube. The contact tip has a central bore which directs the welding wire through the tip, and a diffuser directs the shielding gas around the contact tip and conducts electrical power to the contact tip. A tubular welding nozzle body is formed of a porous polycrystalline graphite material and has a slightly tapered inner surface which surrounds the contact tip for collimating the gas while substantially reducing the accumulation of spatter on the nozzle body. The contact tip may also be covered with the same graphite material to impede spatter accumulation, and the porous graphite material is impregnated with petrolatum and wax to extend the service life of the body. The tubular nozzle body may be protected by a surrounding copper jacket, and an interfitting band of ceramic material retains the body within the jacket.

23 Claims, 1 Drawing Sheet

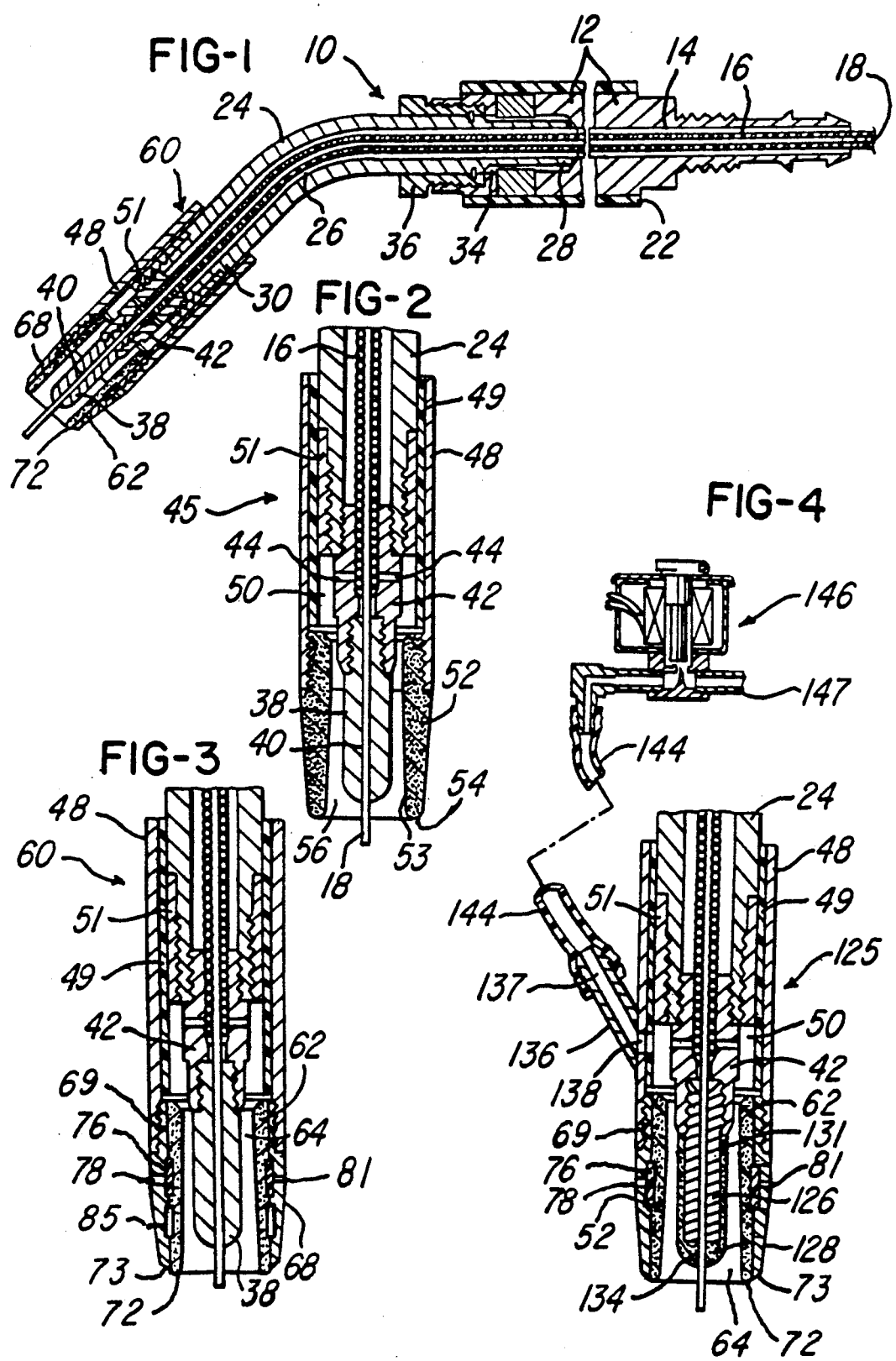

SELF-CLEANING NOZZLE FOR A GAS WELDING TORCH

This application is a continuation-in-part of application Ser. No. 07/837,482 filed Feb. 18, 1992, now abandoned.

BACKGROUND OF THE INVENTION

The present invention relates to gas metal arc welding torches of the general type disclosed, for example, in U.S. Pat. Nos. 2,769,894, No. 2,836,705, No. 3,048,691 and No. 3,226,526, and more specifically, to welding nozzles which are used on torches for gas metal arc welding.

There are three conventional methods of Gas Metal Arc Welding, previously known as Metal Inert Gas (MIG), for transferring welding wire to the weld. These methods are globular, short arc, and spray transfer. Globular type metal transfer across the arc occurs in large, irregular shaped droplets. This type of metal transfer commonly uses shielding gasses consisting of $CO_2$ mixtures and has a disadvantage in that it produces an erratic arc and generates considerable weld spatter. In the short arc method of metal transfer, no metal transfers across the arc. Instead, metal transfer occurs when the electrode wire makes contact with the metal being welded. Shielding gases commonly used with this process are welding grade $CO_2$, argon-$CO_2$ mixtures and argon-oxygen mixtures. Although this type of metal transfer reduces the amount of weld spatter generated by the arc, spatter is still a major problem.

Spray type metal transfer is accomplished by the movement of a stream of small droplets across the arc from the electrode to the metal piece being welded. This type of metal transfer usually employs relatively high voltages and currents. The shielding gases used for this type of weld transfer are usually argon-$CO_2$, argon-oxygen or a combination of argon-$CO_2$-oxygen. Spray type metal transfer produces the least amount of weld spatter of the three basic techniques, but this method requires careful control of the shielding gas mixture. Without proper control, or due to an inexperienced operator or antiquated equipment, even spray type metal transfer can produce weld spatter in the same magnitude as the globular and short arc welds.

When producing a MIG weld in an inert environment, the molten material or spatter adheres to the nozzle. The spatter is made-up of the elements found in both the piece being welded, and the welding wire, e.g. iron, aluminum and silicon. The instant you stop the weld, the shielding gas dissipates leaving this semi-molten material exposed to the atmospheric gases, mainly oxygen. The oxygen reacts chemically to the molten steel, allowing iron and aluminum oxides to form on the inside bore of the welding nozzle. These highly abrasive materials are ground into the surfaces of the nozzle during cleaning, causing the nozzle to degrade rapidly.

As indicated above, a common problem to each of these basic welding processes is weld spatter. One widely used solution throughout the MIG welding industry is to secure a copper welding nozzle to the torch body. The problem with copper welding nozzles is that during the welding process, molten metal or weld spatter, which can reach a temperature of 10000° F. or more, impacts and etches the copper. The constant bombardment of weld spatter erodes the copper and allows the spatter to adhere to the nozzle. Once spatter begins to attach to the nozzle, it will continue to buildup and eventually restricts the flow of shielding gas to the weld. The result is a flawed weld.

Usually a flawed weld occurs before the spatter buildup is detected. As a result, the welded item is rejected and must be either discarded or rewelded, which is time consuming and increases the cost of manufacturing the item. To correct the problem, the operator typically removes the copper nozzle from the welding torch and dislodges the spatter by scraping it off with a sharp metal edge of a tool such as a screwdriver or chisel. Cleaning the copper nozzle in this manner usually reduces the working life of the nozzle because deep scratches and gouges are left by the cleaning tool. In addition, after the nozzle has been subjected several times to spatter removal in this manner, its ability to obstruct spatter buildup diminishes.

Copper nozzles also present a problem because copper is classified as a hazardous material and cannot be discarded in ordinary landfills. Thus the copper nozzles are not easily disposed of and must be recycled. A more significant problem with the use of copper nozzles is the generation of smoke. The smoke results from an anti-spatter compound which is applied to the copper nozzle to inhibit the buildup of weld spatter. When the compound is subjected to the high temperatures associated with welding, smoke is generated. For environmental reasons, it is desirable to reduce the amount of smoke which is generated by most industrial processes.

SUMMARY OF THE INVENTION

The present invention is directed to an improved welding nozzle or nozzle assembly which impedes and substantially reduces the buildup of weld spatter. The improved nozzle is relatively inexpensive to produce and is easily mounted on the outer end portion of a welding torch such as a conventional torch for gas metal arc welding. The torch typically includes a torch body defining a central passage for directing a welding wire, a shielding gas and electrical power therethrough. A conductor tube defines an internal passage and has an inner end portion mounted on the torch body and a free outer end portion. A tubular contact tip has a central bore and is secured to the outer end portion of the conductor tube. The conductor tube directs the welding wire through the center bore of the contact tip, the shielding gas around the contact tip and the electrical power through the contact tip.

In accordance with the present invention, a welding nozzle includes an elongated tubular body having a rounded outer end surface and an inner surface with a 1.5 degree taper for defining an internal bore or passage. The body is formed of a porous polycrystalline graphite material which is vacuum or pressure impregnated with petrolatum and wax. In one embodiment, the body is threadably connected to a metal support sleeve which has an insulator liner, and in another embodiment, the body is protected by a surrounding copper jacket. The graphite body is retained within the jacket by an interfitting band of ceramic material. In a further embodiment, the contact tip is covered by the porous polycrystalline graphite material, which is also impregnated, blasts of compressed air are used to dislodge any accumulation of spatter on the graphite material.

Other features and advantages of the invention will be apparent from the following description, the accompanying drawing and the appended claims.

BRIEF DESCRIPTION OF THE DRAWINGS

FIG. 1 is a schematic axial section view of a welding torch having a polycrystalline graphite nozzle constructed in accordance with the present invention;

FIG. 2 is an enlarged fragmentary section of a second embodiment of a polycrystalline graphite nozzle constructed in accordance with the invention;

FIG. 3 is an enlarged fragmentary section of the graphite nozzle mounted on the welding torch shown in FIG. 1 and with a modification; and FIG. 4 is a fragmentary section of the graphite nozzle shown in FIG. 1 and in combination with a modified contact tip and an air blast port.

DESCRIPTION OF THE PREFERRED EMBODIMENTS

FIG. 1 illustrates a conventional gas metal arc welding torch 10 which typically includes a metal torch body 12 defining a central passage 14 for receiving a shielding gas. A helical wound wire cable 16 extends within the center of the passage 14 for directing a welding wire 18 which is fed through the passage 14. The torch body 12 also forms a conductor for electrical power, and a surrounding tubular insulator 22 extends substantially the full length of the torch body. The torch 10 also includes a metal conductor tube 24 which defines an internal passage 26 and has an inner end portion 28 and a second free or outer end portion 30. The inner end portion 28 has a spline connection 34 with the torch body 12 and is secured to the body by a tubular nut 36.

A contact tip 38 (FIGS. 1 & 2) has a central bore 40 and is threaded into a tubular gas diffuser 42 which is threaded into the outer end portion of the conductor tube 24. The gas diffuser 42 has a set of passages including radial passages 44 for directing the shielding gas flowing through the conductor tube 24, and the wire cable 16 directs the welding wire 18 through the gas diffuser 42 and through the center bore 40 within the contact tip 38. The shielding gasses flow axially around the gas diffuser 42 outwardly and around the contact tip 38 to encase the welding wire 18 as it exits the contact tip. Electrical power is also conducted through the conductor tube 24, the gas diffuser 12 and to the contact tip 38.

Referring to FIG. 2, a tubular welding nozzle or nozzle assembly 45 is constructed in accordance with the invention and includes a cylindrical sleeve 48 which is preferably formed of copper. The sleeve 48 is lined with a glass filled phenolic or silicone glass insulator sleeve 49 which is press-fitted into the copper sleeve and mounts on the conductor tube 24. The liner sleeve 49 cooperates with the diffuser 42 to define an annular gas chamber 50 for receiving the gas flowing through the ports 44. An internally threaded brass sleeve 51 is press-fitted into the insulator sleeve 49 and threads onto the outer end portion of the conductor tube 24. A tubular nozzle body 52 is formed of a porous polycrystalline graphite material and has an inner portion threaded into the sleeve 48. The nozzle body 52 has an inner bore or surface 53 which tapers outwardly and surrounds the contact tip 38 to define therebetween an annular passage 56 for directing the shielding gas outwardly in a collimated flow around the contact tip 38 and the welding wire 18. The inner surface 53 has a taper of about 1.5 degrees, and the body 52 has a rounded outer end surface 54. The nozzle assembly 45 may be removed from the conductor tube 24 by unthreading the assembly 45 from the conductor tube.

One particular polycrystalline graphite material used to form the nozzle body 52 and which effectively impeded the accumulation of weld spatter on the body was a G-10 and G-20 polycrystalline graphite sold by Graphite Engineering and Sales Co. of Greenville, Michigan. Another polycrystalline graphite material which produces highly desirable results is made by Poco Graphite, Inc. in Decatur, Texas and sold as Grade PGCS-3. This porous polycrystalline graphite material has an apparent density from 1.64 to 1.80 grams per cubic centimeter and a total porosity ranging from 18 to 40 percent by volume. The material has a hardness within the range of 45 to 75 on the Shore Scleroscope, and from 64 to 95 percent of the total porosity is formed by open pores. The graphite particles forming the body 52 have a size ranging from 5 to 25 microns, and the size of the open pores ranges from 0.8 to 3 microns.

While the porous polycrystalline graphite nozzle body 52 has proven extremely effective in impeding the accumulation of weld spatter on the nozzle, when weld spatter does begin to accumulate on the nozzle body 52, the spatter may be easily removed by merely wiping the nozzle body with a leather welding glove.

It has also been found very desirable to impregnate the porous polycrystalline graphite nozzle body 52 with an impregnating material such as 90% petrolatum and 10% polycrystalline wax, by weight, This material is heated in a pressure vessel to a temperature between about 350° F. and 375° F. to form a fluid bath. The graphite nozzle body is submerged into the bath and the vessel is pressurized at 30 psi for a period of about seven minutes. The impregnating material displaces the air in the open pores of the body and prevents moisture from entering the pores. When the nozzle body heats up during a welding operation, the nozzle body begins to excrete the impregnating material at a temperature of approximately 200° F. to 300° F. This causes the inner and end surfaces of the nozzle body to become slippery and thereby be continuously self-cleaning.

An impregnated polycrystalline graphite nozzle body produced in accordance with the invention has proven to be extremely superior when compared with conventional copper nozzle bodies. That is, the impregnated nozzle body not only results in a low coefficient of surface friction which minimizes the buildup of spatter but has a high temperature rating and withstands thermal shock, all of which provide for a significantly longer service life. For example, in one welding operation, an impregnated nozzle body provided a continuous service life of 18 weeks as compared to less than one day for a copper nozzle body. The prevention or minimizing of spatter buildup also enables the shielding gas to be more precisely controlled, and the tapered inner surface collimates the gas in the passage 56 and directs the gas towards the weld. This has resulted in a reduction of the amount of welding gas required by about 40 percent. Another important advantage of the polycrystalline graphite nozzle body is the reduction of smoke generated by the welding process and the reduction in the pollution of the environment. As mentioned above, the smoke is a by-product of the anti-spatter compound commonly applied to a copper nozzle during the welding process. The impregnated graphite nozzle body as described above use significantly less impregnating material and substantially reduces the amount of smoke generated.

FIGS. 1 and 3 illustrate another embodiment of the invention. In this embodiment, a nozzle assembly 60 includes a metal sleeve 48 lined with an insulator sleeve 49 which receives the internally threaded sleeve 51, as described above. In this embodiment, a nozzle body 62 is formed of a porous polycrystalline graphite material as used in forming the nozzle body 52, and the inner surface of the body 62 has a 1.5 degree taper to define the diverging passage 64. The graphite body 62 is confined within a surrounding copper shell or jacket 68 having an inner portion 69 with external threads for threadably engaging the outer end portion of the copper sleeve 48.

The graphite body 62 has a rounded outer end surface 72 which projects slightly from a tapered or chamfered end surface 73 on the jacket 68. The inner surface of the copper jacket 68 and the outer surface of the graphite body 62 are provided with opposing annular channels or grooves which are filled with a ceramic material to form an inter connecting rigid band 76. One ceramic material which has been used for effectively securing the graphite body 62 to the surrounding shell or jacket 68 is produced by Cotronics in Brooklyn, New York, and sold under the trademark ZIRCONIA 904 adhesive. This ceramic material is supplied in a fluid form and is injected into the grooves through a hole 78 extending through the copper jacket 68. A diametrically opposed vent hole 81 is also formed in the jacket 68 to vent air from the grooves when the ceramic material is injected and allow the grooves to be filled.

After the grooves are filled to form the ring or band 76, the material is heated to approximately 200° F. by heating the nozzle assembly 60 within an oven or with the use of a heat gun. The heat expels the moisture from the adhesive so that the adhesive cures to form the interlocking rigid band 76. This band has been found highly desirable in view of the fact that the thermal expansion rate for the copper jacket 68 is 2 to 4 times higher than that of the graphite body 62. Thus when the copper jacket 68 expands during the welding operation, the ceramic band 76 retains the graphite body 62 and prevents it from sliding out of the jacket.

The nozzle assembly 60 shown in FIG. 3 is the same as the nozzle assembly 60 shown in FIG. 1, except that the nozzle assembly shown in FIG. 3 includes another set of opposing circumferential grooves which define an annular chamber 85. After the graphite body 62 is impregnated with petrolatum and wax in the same manner as described above for the nozzle body 52, the nozzle body 62 is assembled into the surrounding copper sleeve or jacket 68 and connected by the ceramic ring or band 78. The nozzle body 62 is then impregnated again to fill the annular chamber 85 with the petrolatum and wax. This impregnation of the graphite body 62 significantly extends the self-cleaning ability of the nozzle body.

FIG. 4 illustrates a modification of the nozzle assembly 60 shown in FIG. 1. In FIG. 4, a nozzle assembly 125 includes a contact tip 126 which is covered by a contact tip cover 128 formed of a polycrystalline graphite material which is the same material forming the nozzle bodies 52 and 62. The tip cover 128 includes a cylindrical portion 131 which surrounds the contact tip 126 and has a semi-spherical outer end surface with a center bore 134 for receiving the weld wire 18. The tip cover 128 is also impregnated in the same manner as the bodies 52 and 62, and inhibits spatter from adhering to the contact tip 126 during welding operation. The tip cover also prevents the welding wire from burning back and welding itself to the contact tip 126.

The nozzle assembly 125 also includes an air blast tube 136 which defines a port 137 connected to the chamber 50 by a hole 138 within the sleeve 48 and liner sleeve 49. The air blast tube 136 is connected by a flexible tube 144 to a source (not shown) of compressed air controlled by a conventional solenoid valve 146 within an air supply line 147. In operation of the FIG. 4 embodiment, at the completion of each weld, the solenoid valve 146 opens and directs a blast of compressed air from the source through the line 144 and tube 136. When the blast of compressed air flows into chamber 64, it cleans any weld spatter collected on the graphite nozzle body 62 and/or contact tip cover 128 during the welding operation.

While the forms of welding nozzles herein described constitute preferred embodiments of the invention, it is to be understood that the invention is not to be limited to these precise forms of nozzles, and that changes may be made therein without departing from the scope and spirit of the invention as defined in the appended claims.

The invention having been described, the following is claimed:

1. A welding nozzle adapted for use on a gas shield welding torch having an outlet end portion, comprising a tubular nozzle body having an inner surface defining an internal gas passage and including an inner end portion and an outer end portion, means for removably attaching said nozzle body to the outlet end portion of the welding torch, said nozzle body comprising a substantially portion of polycrystalline graphite having open pores extending to said inner surface, and said polycrystalline graphite body being impregnated with a wax which releases through said pores to said inner surface in response to the heat from welding for significantly reducing the accumulation of weld spatter on said nozzle body and for substantially extending the service life of said nozzle.

2. A welding nozzle as defined in claim 1 therein said nozzle body comprises at least ninety percent polycrystalline graphite by volume.

3. A welding nozzle as defined in claim 1 wherein said inner surface increases in diameter towards said outer end portion of said nozzle body and forms a taper of about 1.5 degrees relative to the axis of said body.

4. A welding nozzle as defined in claim 1 wherein said nozzle body has a total porosity of closed and open pores from 18 to 40 percent by volume, and said open pores are from 64 to 95 percent of said total porosity to provide for retaining and controlled release of said impregnated material.

5. A welding nozzle as defined in claim 1 where said polycrystalline graphite nozzle body comprises primarily particles having a size ranging from 5 to 25 microns, and the size of said open pores ranges from 0.8 to 3 microns.

6. A welding nozzle as defined in claim 1 wherein said polycrystalline graphite body has a hardness on a Shore Scleroscope within the range of 40 to 75.

7. A welding nozzle as defined in claim 1 wherein said impregnated polycrystalline graphite body has a thermal conductivity between 80 and 100 watts/mxK.

8. A welding nozzle adapted for use on a gas shield welding torch having an outlet end portion, comprising a tubular nozzle body having an inner surface defining an internal gas passage and including an inner end portion and an outer end portion, means for removably attaching said nozzle body to the outlet end portion of the welding torch, said nozzle body comprising a substantial portion of polycrystalline graphite having open pores extending to said inner surface, said inner surface increases in diameter towards said outer end portion of said nozzle body, a tubular metal jacket surrounding said polycrystalline graphite nozzle body, means for connecting said nozzle body to said metal jacket and providing for greater expansion of said metal jacket relative to said nozzle body, and said polycrystalline graphite body being impregnated with a material which releases through said pores to said inner surface in response to the heat from welding for significantly reducing the accumulation of weld spatter on said nozzle body and for substantially extending the service life of said nozzle.

9. A welding nozzle as defined in claim 8 wherein said impregnated material comprises polycrystalline wax, and said wax expands through said pores in response to heat.

10. A welding nozzle as defined in claim 8 wherein said connecting means comprise a ring of ceramic material disposed within opposing grooves formed in said jacket and said body.

11. A welding nozzle as defined in claim 8 wherein said metal jacket and said nozzle body define therebetween a channel, and said impregnated material extends into said channel.

12. A welding nozzle as defined in claim 8 wherein said polycrystalline graphite body has a rounded outer end surface, said jacket has a tapered outer end surface, and said rounded outer end surface of said nozzle body projects slightly beyond said end surface of said jacket.

13. A welding nozzle adapted for use on a gas shield welding torch having an outlet end portion, comprising a tubular nozzle body having an inner surface defining an internal gas passage and including an inner end portion and an outer end portion, means for removably attaching said nozzle body to the outlet end portion of the welding torch, said nozzle body comprising a substantial portion of polycrystalline graphite having open pores extending to said inner surface, said inner surface increasing in diameter towards said outer end portion of said nozzle body and forming a taper of about 1.5 degrees relative to the axis of said body, said body having a rounded outer end surface, and said body being impregnated with a material which releases through said pores to said inner surface in response to the heat from welding for significantly reducing the accumulation of weld spatter on said nozzle body and for substantially extending the service life of said nozzle.

14. A welding nozzle as defined in claim 13 wherein said impregnated material comprises polycrystalline wax, and said wax expands through said pores in response to heat.

15. A welding nozzle as defined in claim 14 wherein said impregnated material also includes petrolatum.

16. A welding nozzle adapted for use on a gas shield welding torch having an outlet end portion, comprising a tubular nozzle body having an inner surface defining an internal gas passage and including an inner end portion and an outer end portion, means for removably attaching said nozzle body to the outlet end portion of the welding torch, said nozzle body comprising a substantial portion of polycrystalline graphite having open pores extending to said inner surface, and said polycrystalline graphite body being impregnated with a material comprising polycrystalline wax which expands and releases through said pores to said inner surface in response to the heat from welding for significantly reducing the accumulation of weld spatter on said nozzle body and for substantially extending the service life of said nozzle.

17. A welding nozzle as defined in claim 16 wherein said impregnated material also includes petrolatum.

18. A welding nozzle adapted for use on a gas shield welding torch having an outlet end portion, comprising a tubular nozzle body having an inner surface defining an internal gas passage and including an inner end portion and an outer end portion, means for removably attaching said nozzle body to the outlet end portion of the welding torch, said nozzle body comprising a substantial portion of polycrystalline graphite having open pores extending to said inner surface, a tubular metal jacket surrounding said nozzle body, means for connecting said nozzle body to said metal jacket, said connecting means providing for greater expansion of said metal jacket relative to said nozzle body while retaining said body within said jacket, and said polycrystalline graphite body being impregnated with a material which releases through said pores to said inner surface in response to the heat from welding for significantly reducing the accumulation of weld spatter on said nozzle body and for substantially extending the service life of said nozzle.

19. A welding nozzle as defined in claim 18 wherein said connecting means comprise a ring of ceramic material disposed within opposing grooves formed in said jacket and said body.

20. A welding nozzle as defined in claim 18 wherein said metal jacket and said nozzle body define therebetween a channel, and said impregnated material extends into said channel.

21. A welding nozzle adapted for use on a gas shield welding torch having an outlet end portion, comprising a tubular nozzle body having an inner surface defining an internal gas passage and including an inner end portion and an outer end portion, means for removably attaching said nozzle body to the outlet end portion of the welding torch, said nozzle body comprising a substantial portion of polycrystalline graphite having open pores extending to said inner surface, said graphite body having a rounded outer end surface, a tubular metal jacket surrounding said nozzle body, said jacket having a tapered outer end surface, said rounded outer end surface of said nozzle body projecting slightly beyond said end surface of said jacket, and said polycrystalline graphite body being impregnated with a material which releases through said pores to said inner surface in response to the heat from welding for significantly reducing the accumulation of weld spatter on said nozzle body and for substantially extending the service life of said nozzle.

22. A welding nozzle as defined in claim 21 wherein substantially all of said nozzle body is confined within said metal jacket for protecting said body.

23. A welding nozzle adapted for use on a gas shield welding torch having an outlet end portion, comprising a tubular nozzle body having an inner surface defining an internal gas passage and including an inner end portion and an outer end portion, means for removably attaching said nozzle body to the outlet end portion of the welding torch, said nozzle body comprising a substantial portion of polycrystalline graphite having open pores extending to said inner surface, said polycrystalline graphite body being impregnated with a material which releases through said pores to said inner surface in response to the heat from welding for significantly reducing the accumulation of weld spatter on said nozzle body and for substantially extending the service life of said nozzle, a tubular metal jacket surrounding said nozzle body, said attaching means including a tubular metal sleeve connected to said jacket, and a tube projecting laterally from said metal sleeve for directing a blast of compressed air into said internal passage and along said inner surface of said nozzle body.

* * * * *